Sept. 1, 1953 P. L. McCLASKEY 2,650,384
OIL GAUGE ROD WIPER
Filed Jan. 30, 1948
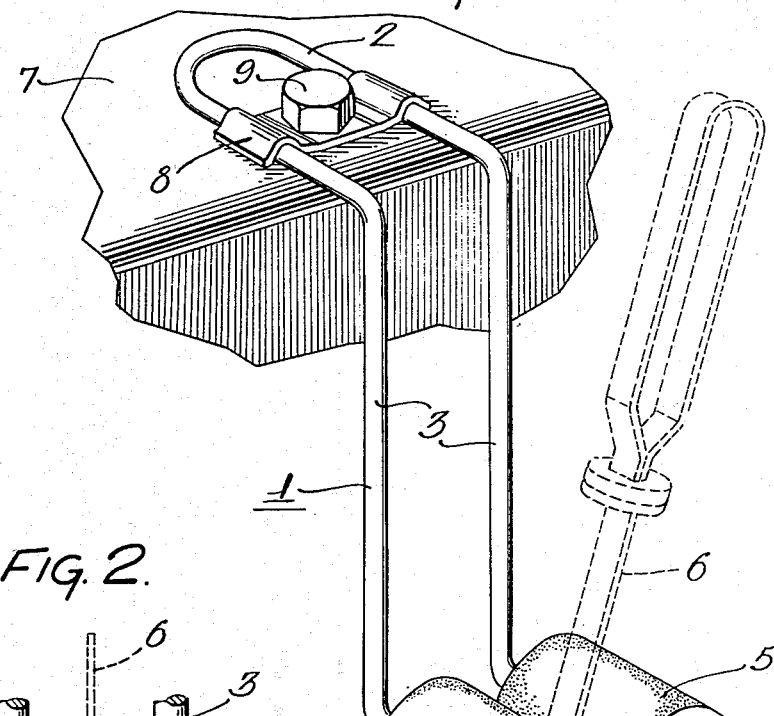
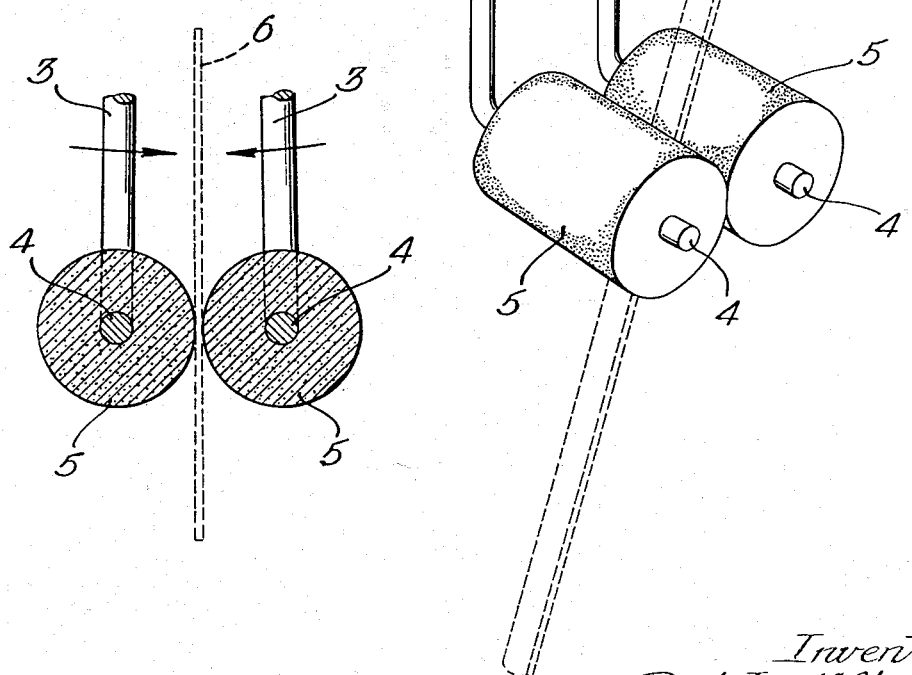
Inventor:
Paul L. McClaskey
by his Attorneys
Howson &
Howson Patented Sept. 1, 1953

2,650,384

UNITED STATES PATENT OFFICE 2,650,384

OIL GAUGE ROD WIPER

Paul L. McClaskey, Phoenixville, Pa.

Application January 30, 1948, Serial No. 5,399

1 Claim. (Cl. 15—210)

This invention relates to oil gauge rod wiper devices, particularly for use in connection with automobiles and like vehicles.

It is the practice generally, among automobile owners, service station attendants and automobile mechanics, to use an old piece of cloth or the like to wipe an oil gauge rod when determining the oil level in the crank case of an automobile or other such motor vehicle. This practice not only necessitates the handling of oily cloths but it constitutes a fire hazard since such cloths are commonly stored in automobiles, garages and other places. Various oil gauge rod wiper devices have been proposed heretofore, but they have not been entirely satisfactory and have not gone into use to any appreciable extent.

One object of the present invention is to provide a simple and efficient device of this general character which may be easily mounted in fixed position, preferably on an automobile or like vehicle, where it will be readily accessible for use.

Another object of the invention is to provide a device of this character which may be manufactured at very low cost and may be sold at a correspondingly low price.

A further object of the invention is to provide a device which can be easily mounted, particularly on an automobile or like vehicle, by any inexperienced person.

Still another object of the invention is to provide a device having readily replaceable wiping elements which may be renewed from time to time.

The invention may be fully understood by reference to the accompanying drawing illustrating a preferred embodiment, wherein:

Fig. 1 is a perspective view of the device, showing one form of mounting and also showing the manner of use of the device; and Fig. 2 is a cross-sectional view taken through the wiper rolls with an oil gauge rod therebetween.

Referring more particularly to the drawing, the device comprises a resilient rod or heavy wire element designated generally by reference character 1, which is bent in the manner shown to provide a U-shaped mounting portion 2, a pair of legs 3 extending from said portion, and a pair of foot-like end portions 4 extending from the legs 3. Preferably the legs 3 extend from the mounting portion 2 at a substantial angle, and the feet 4 likewise extend from the legs 3 at a substantial angle. In each instance, the angle may be approximately 90°. Removably mounted on the feet 4 are a pair of similar wiper rolls 5, between which an oil gauge rod 6 may be drawn as illustrated.

The resilient rod 1 may be composed of spring steel or any other durable resilient material. The wiper rolls 5 may be formed of felt or any other suitable soft material. These rolls are adapted to fit snugly on the feet 4 so as to be just tight enough not to revolve when the oil gauge rod is drawn between them. However, the rolls may be easily revolved from time to time to present clean wiping surfaces.

The mounting portion 2 is adapted to mount the device in a fixed position by means of a simple bracket or clamp as illustrated. In the illustration, there is shown at 7 a portion of the wall beneath the hood of an ordinary automobile to the rear of the engine thereof. The wiper device is mounted on said wall by means of a simple clamp 8 secured to the wall by means of a bolt or screw 9.

As may be seen in Fig. 2, the wiper rolls 5 are urged toward one another in the directions of the arrows by the resilience of the legs 3. In using the device, the upper part of the oil gauge rod is slid between the rolls and the rod is then drawn upward through the rolls to wipe the lower portion thereof.

It will be apparent that the device provided by the invention is extremely simple and is easy to install and use, and it may be manufactured at very low cost and sold at a low price. In view of these features, the device is highly practical and appealing both to automobile owners and to service men.

In a particular operative embodiment of the device, the rod 1 was formed of one-fourth inch steel rod, and the wiper rolls were felt rolls approximately one inch in diameter.

It will be understood, of course, that the invention is not limited to the specific embodiment illustrated and described but is capable of modifications such as will occur to those skilled in the art.

I claim:

An oil gauge rod wiper and mounting clamp therefor, comprising a single resilient rod having a U bend midway of its ends, the adjacent portions of said rod provided by said U bend being spaced and substantially parallel throughout their lengths from the U bend to the ends of said rod, said portions having angle bends forming oppositely directed extensions terminating at said U bend and at said ends, a mounting clamp adapted to span and engage the extensions terminating at said U bend, and a pair of cylindrical wiper rolls respectively carried by the extensions terminating at said ends and between which an oil gauge rod may be drawn.

PAUL L. McCLASKEY.

References Cited in the file of this patent

UNITED STATES PATENTS

| Number | Name | Date |
|---|---|---|
| 891,564 | Pike | June 23, 1908 |
| 1,747,100 | Ashworth | Feb. 11, 1930 |
| 1,871,208 | Bouchard | Aug. 9, 1932 |
| 1,909,834 | Juliar | May 16, 1933 |
| 1,922,450 | O'Brien | Aug. 15, 1933 |
| 2,424,046 | Moore et al. | July 15, 1947 |
| 2,483,536 | Gamble et al. | Oct. 4, 1949 |

FOREIGN PATENTS

| Number | Country | Date |
|---|---|---|
| 267,694 | Great Britain | Mar. 24, 1927 |